Feb. 27, 1962
A. F. HASBROOK
3,022,851
SONIC IMPULSE GENERATORS FOR USE IN
GEOPHYSICAL EXPLORATION
Filed March 31, 1958
3 Sheets-Sheet 1
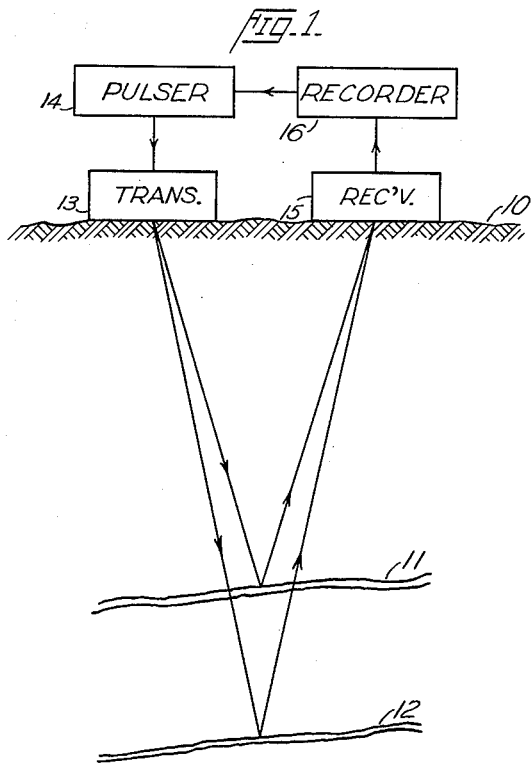
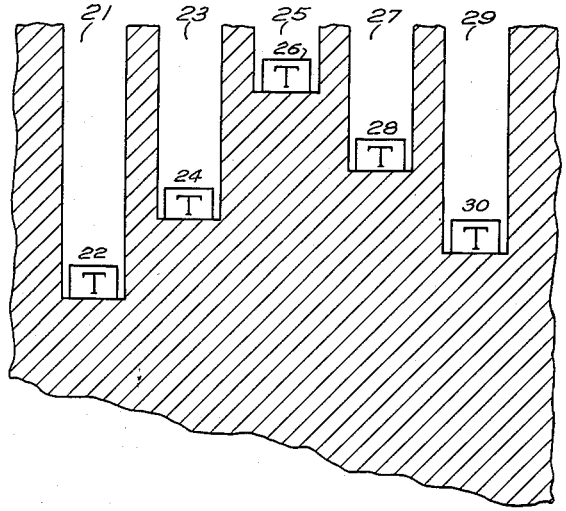
INVENTOR
Arthur F. Hasbrook Feb. 27, 1962

A. F. HASBROOK 3,022,851

SONIC IMPULSE GENERATORS FOR USE IN
GEOPHYSICAL EXPLORATION

Filed March 31, 1958

INVENTOR

Arthur F. Hasbrook

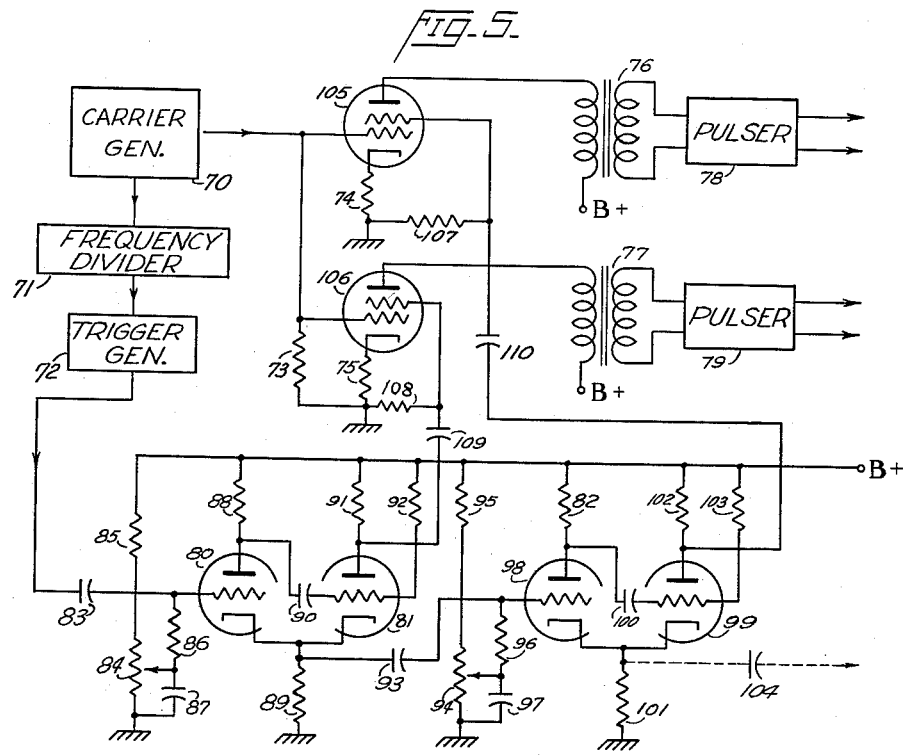
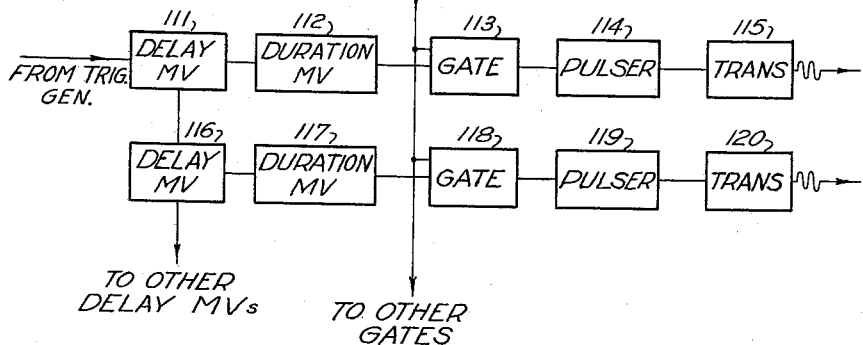
INVENTOR
Arthur F. Hasbrook

United States Patent Office 3,022,851
Patented Feb. 27, 1962

3,022,851
SONIC IMPULSE GENERATORS FOR USE IN
GEOPHYSICAL EXPLORATION
Arthur F. Hasbrook, Bexar County, Tex., assignor to
Olive S. Petty, San Antonio, Tex.
Filed Mar. 31, 1958, Ser. No. 725,282
2 Claims. (Cl. 181—.5)

This invention relates to sonic geophysical exploration and is directed particularly to improvements in the generation of sonic impulses in the earth. More specifically, the invention is concerned with increasing the amplitude and directivity of the sonic impulses impressed on the surface without unduly increasing the peak voltage or peak power requirements of the generating apparatus.

In geophysical prospecting by the sonic reflection method it has been common practice to impress sonic impulses on the surface or near-surface by applying electrical impulses to a transducer unit which is coupled closely to the earth. The sonic impulses thus impressed travel into the sub-surface as sonic waves which are partially reflected at the interfaces of various strata. After traveling back to the surface, these reflected sonic waves are detected by a receiving transducer and converted into electrical signals which are applied to a recording medium. When propagation conditions within the earth are satisfactory and the system characteristics are chosen properly, the recording is characterized by signal tracings corresponding to sonic reflections from different strata in the sub-surface. Since the sonic waves are attenuated greatly in traveling through hundreds or thousands of feet of sub-surface, it is essential that quite high peak powers be used in the generation of the sonic impulses in order to permit exploration of deeply buried geological features which may be of interest.

The peak power required to obtain useful sonic reflections will vary with the type of sub-surface encountered and the maximum penetration required; in general, however, the necessary peak power will be in the range from tens of kilowatts to tens of megawatts. Peak powers of these magnitudes can be generated quite readily in the laboratory by well-known techniques, but for field use considerable modification and compromise is required to provide equipment of size and weight which can be transported readily over difficult terrain. For example, the average power capabilities may necessitate reducing the repetition rate of the sonic impulses below that rate which is otherwise desirable. Peak power capabilities of the entire system are dependent on many factors, such as the maximum ratings for available power tubes, power dissipation capabilities of the transducer units and voltage and power ratings of many associated components. Under these limiting conditions it is very desirable that improvements be provided for increasing the effective radiated sonic impulse power without increasing unduly the ratings on the various individual units and components of the system.

The principal object of this invention is to provide a method and means of generating sonic impulses within the surface by an improved arrangement of electrical impulse sources and sonic transducers. A further object is to provide improvement in sonic impulse generation by use of exactly synchronized pluralities of electrical impulse sources and sonic transducers. Still another object is to provide improvements wherein the effective peak sonic impulse generated by a group of synchronized sonic transducers is considerably increased without increasing the peak power requirements of the generating apparatus.

The foregoing and other objects will be better understood by reference to the following description and the accompanying drawings wherein:

FIGURE 1 is a representation of a cross section of the sub-surface shown in conjunction with a block diagram illustrating the general arrangement of a system for sonic geophysical exploration;

FIGURE 2 represents a cross-section of the earth near the surface, and illustrates schematically one arrangement of a plurality of sonic transducers;

FIGURE 5 is a combined block diagram and schematic illustrating specific circuits which are applicable to certain blocks of FIGURE 3; and FIGURE 6 is a block diagram illustrating an alternative arrangement which permits adjustment of an additional system parameter.

Figure 3:
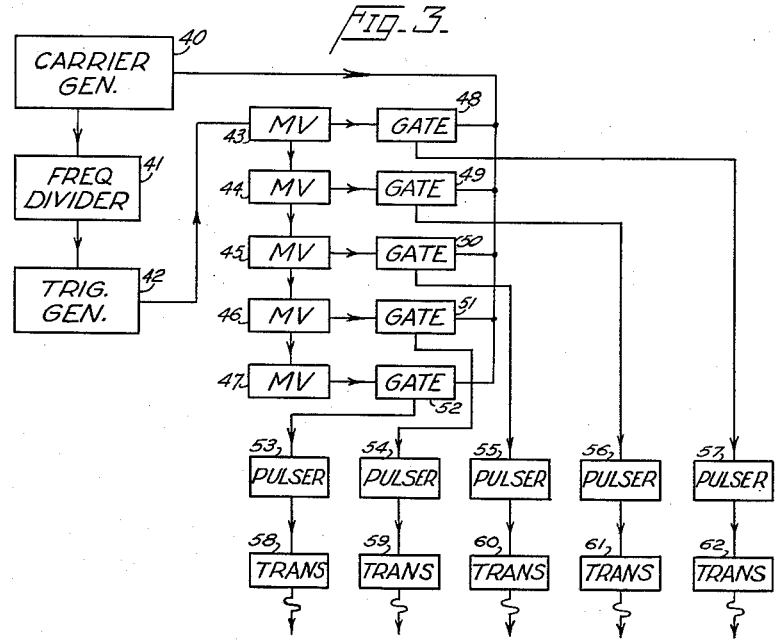
FIGURE 3 is a block diagram showing the general circuitry used in one arrangement of the present invention.

Referring now to FIGURE 1 of the drawing, a representative cross section of the earth is shown in which surface 10 is underlain by reflecting sub-surface strata 11 and 12. The sonic exploration equipment, comprised generally by the transmitting transducer 13, pulser unit 14, receiving transducer 15 and recorder 16, is set up on surface 10 and operated so as to transmit sonic impulses toward and receive reflected sonic waves from the sub-surface strata 11 and 12. Transmitting transducer 13, which may be any type capable of utilizing the large peak powers required, is coupled closely to the surface of the earth so as to insure maximum efficiency in the generation of the sonic impulses. Pulser unit 14 is a source of high power electrical impulses of the desired characteristics for proper energization of transmitting transducer 13. Receiving transducer 15, which also is coupled closely to the surface, is designed to have the high sensitivity required for detection of very low amplitude reflected sonic waves. Recorder 16 usually is a type which produces a simulated cross section of the sub-surface. In some arrangements, however, recorder 16 may be designed to provide reproducible recordings on media such as magnetic tape. Whatever type of recording is employed, synchronization is provided between pulser 14 and recorder 16 to insure proper correspondence between the instant of the transmitted sonic impulse and a reference line on the recording medium.

Operation and functioning of the sonic exploration equipment shown in FIGURE 1 is now described. Pulser 14 is synchronized with recorder 16 so as to supply high power electrical impulses to transmitting transducer 13. Sonic waves, resultant from the sonic impulses impressed by transmitting transducer 13 on surface 10 travel through the sub-surface and encounter partial reflection at the several strata 11 and 12. These reflected sonic waves travel back to the surface 10, are detected by receiving transducer 15 and converted into electrical signals which are applied to recorder 16. As stated previously, recorder 16 usually is arranged to furnish directly a representation of the sub-surface over which the sonic exploration equipment has been operated. It may be desirable, however, to record the sonic information as reproducible waveforms which may be utilized and analyzed subsequently. In some instances it may be preferable to make both a direct visual recording and, additionally, a reproducible recording for further detailed analysis.

Whatever the modifications introduced in the generalized arrangement of FIGURE 1 in order to achieve various specific objects, the requirement remains that quite large peak impulse powers must be utilized to obtain reflected sonic waves of useful amplitude from considerable depths in the sub-surface. One of the major advantages of sonic reflection exploration, as compared to seismic exploration, is that much higher frequencies may be utilized to provide excellent resolution of rather small anomalous features in the sub-surface. For example, the frequency chosen for use in a sonic exploration system may be equivalent to a wavelength of a foot or so in earth so as to permit determination of the true relationship of several closely-spaced thin strata, whereas the use of the much longer wavelengths employed in seismic exploration would show the several strata as a single reflector. Unfortunately the higher frequency sonic waves encounter much higher attenuation in travel through the sub-surface, so that quite high sonic impulse powers are necessary to insure useable reflections. In practice, however, the power handling capability of a single transmitting transducer is considerably below the level often required. Power limitations of similar nature apply to the other units such as the pulser and prime power supply. Although it is possible to use parallel combinations of transmitting transducers to furnish higher power impulses, it is preferable to avoid undue increases in the total peak power such as would be required in simple parallel operation. In the present invention a plurality of vertically spaced transmitting transducers is used in conjunction with a plurality of sequentially operating pulsers to provide an effective radiated impulse of higher power without undue increase in the peak power requirements of any unit.

In FIGURE 2 one suitable arrangement is shown of a plurality of transmitting transducers 22, 24, 26, 28 and 30 coupled closely to the earth 20 in horizontally spaced holes 21, 23, 25, 27 and 29. To achieve improved efficiency in coupling, the holes 21, 23, 25, 27 and 29 may be filled with water or earth. In order to achieve the advantages of the present invention, the vertical spacing between the individual transmitting transducers 22, 24, 26, 28 and 30 is equal to the product VP, where V is the velocity of sonic waves in the surface layer and P is the repetition period or time interval between the onsets of two adjacent impulses generated in successively energized transducers. For example, if the velocity is 3000 feet per second and the repetition period is .001 second, then the vertical spacing between each of the transmitting transducers 22, 24, 26, 28 and 30 should be 3 feet. Usually the repetition period will be equal to or greater than the impulse duration. If the repetition period is less than the pulse length, several impulses will be generated partially simultaneously, and the total peak power requirements of the equipment will be increased. Now if the applied electrical impulses to transmitting transducers 24, 26, 28 and 30 are delayed in time so that the resulting sonic impulses reinforce each other and the last sonic impulse impressed by transmitting transducer 22, then the effective power in the total sonic impulse radiated downward in the earth is the additive combination of the separate sonic impulses. The horizontal spacing of the transmitting transducers 22, 24, 26, 28 and 30 achieves several objects. No transmitting transducer is immediately below another such transducer so that losses due to wave-interference and "shadowing" are lowered. Obviously the horizontal spacing to achieve this result need be only a foot or two. Furthermore, by suitable choice of the horizontal spacings it is possible to achieve considerable increase in effective radiated power due to directive beaming.

In FIGURE 3 an arrangement is shown for generating electrical impulses in the manner required for proper sequential energization of a plurality of vertically spaced transmitting transducers. Carrier generator 40 supplies a continuous carrier frequency signal to a plurality of electronic gates 48, 49, 50, 51 and 52 which are normally non-conducting. Continuous carrier frequency signal from carrier generator 40 also is applied to a frequency divider 41 which may be of any type well-known to the electronic art, such as synchronized multivibrator or regenerative sine wave divider circuits. The output of frequency divider 41 is a lower frequency signal which is applied to trigger generator 42 so as to determine the pulse repetition rate for the equipment. Trigger pulse output from trigger generator 42 is applied to a chain of interconnected multivibrator circuits 43, 44, 45, 46 and 47, each of which is associated with one of the electronic gates 48, 49, 50, 51 and 52. Each of the multivibrators 43, 44, 45, 46 and 47 is of the monostable type which is normally quiescent and produces a pulse output of controllable duration when triggered. The first multivibrator 43 is triggered by the output of trigger generator 42 so as to produce an output gating pulse of the desired duration. The trailing edge of the output gating pulse from multivibrator 43 triggers multivibrator 44 into action, and similarly multivibrators 45, 46 and 47 are triggered by the trailing edges of the preceding pulses in the sequence. The overall result is a sequence of output gating pulses, from the chain of multivibrators 43, 44, 45, 46 and 47, suitable for actuation of the associated respective electronic gates 48, 49, 50, 51 and 52. By way of illustration, multivibrator 43 produces an output gating pulse which is applied to electronic gate 48 so as to permit conduction of carrier frequency signal from carrier generator 40 to pulser circuit 57. High power electrical impulse energy is furnished by pulser 57, so long as gate 48 is conducting, to transmitting transducer 62 so as to produce sonic impulse energy in the surface. Similarly, when the next multivibrator 44 in the sequence produces an output gating pulse which is applied to electronic gate 49, carrier frequency signal from carrier generator 40 is conducted to pulser 56 so as to furnish an electrical impulse to transmitting transducer 61. In a similar manner the other pulsers 53, 54, and 55 are excited in the proper sequence to supply electrical impulses to associated transmitting transducers 58, 59 and 60.

Figure 4:
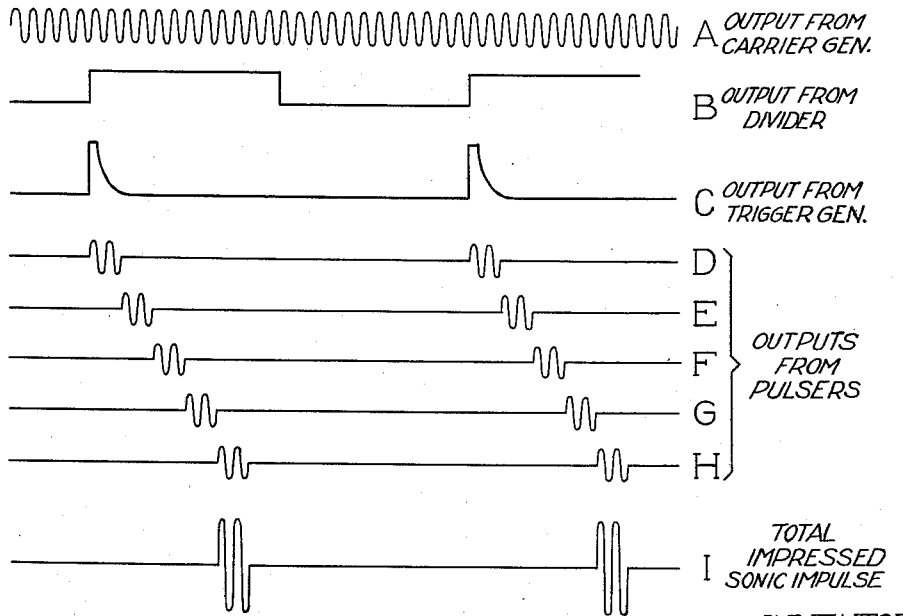
FIGURE 4 is a group of related waveforms corresponding to the signals present at certain positions in the block diagram of FIGURE 3.

Referring now to FIGURE 4, there is shown a series of waveforms illustrating the signals present at various locations in the block diagram of FIGURE 3. The output from carrier generator 40 is a continuous sine wave carrier frequency signal as illustrated in waveform A. This continuous sine wave signal is applied to frequency divider 41 so as to supply a synchronized lower frequency signal which is illustrated in waveform B. The square waveform shown is obtained readily by use of a series of multivibrators of the bistable type which is well-known in the electronic art. The lower frequency square wave output from frequency divider 41 is applied to trigger generator 42, which may be of the widely used monostable type, so as to furnish the relatively short trigger pulse illustrated in waveform C. It will be noted that the trigger pulses from trigger generator 42 form the basic impulse repetition rate for the system. Furthermore, these trigger pulses are synchronized exactly with the continuous carrier frequency signals from carrier generator 40, by way of frequency divider 41. The trigger pulses are applied to the chain of interconnected monostable multivibrators 43, 44, 45, 46 and 47 so as to furnish a sequence of gating pulses for use in actuating the associated plurality of electronic gates. As a result of this actuation, electronic gates 48, 49, 50, 51 and 52 are rendered conducting, in sequential manner, so as to permit continuous carrier frequency signals from carrier generator 40 to energize the associated pulser circuits 53, 54, 55, 56 and 57. High power electrical impulses are furnished by pulser circuits 53, 54, 55, 56 and 57 in the sequential arrangement illustrated in waveforms D, E, F, G and H of FIGURE 4. When this sequence of electrical impulses is applied to the associated plurality of properly spaced transmitting transducers 58, 59, 60, 61 and 62, the resultant sonic impulses from all transducers combine additively in the downward direction to form the higher amplitude sonic impulse shown in waveform I. Since the pulser circuits 53, 54, 55, 56 and 57 are not operating simultaneously, the total peak primary power requirement is equivalent to that of a single pulser circuit.

Nevertheless, the vertical spacing of the transmitting transducers is such that each sonic impulse is impressed in synchronism with the downward moving wave-front so as to effect additive combination. The overall result is a total impressed sonic impulse of much larger amplitude, obtained with no increase in the peak power requirements of the pulser circuits.

In FIGURE 5 of the drawing suitable circuitry is shown for use in some portions of the block diagram of FIGURE 3. As mentioned before, carrier generator 70 may be any stable source of continuous carrier frequency signal, such as a sine wave oscillator. Frequency divider 71 may be comprised by a series of bistable multivibrators, so as to produce a lower frequency output synchronized with the carrier frequency output from carrier generator 70. Trigger generator 72 is arranged to produce a single trigger pulse for each cycle of the applied lower frequency output from frequency divider 71. The continuous carrier frequency signal from carrier generator 70 is applied, across grid resistor 73, to the control grids of the electronic gate tubes 105 and 106, which normally have little or no screen potential applied. Under these conditions, the transconductance of tubes 105 and 106 is so low as to effectively prevent amplification of signals applied to the control grid. Electronic gate tubes 105 and 106 may be actuated at the proper instants, however, by application of gating pulses to the screen so as to increase the transductance. Suitable gating pulses are supplied by the multivibrator circuits comprised by vacuum tubes 80 and 81, or 98 and 99, and associated components. The multivibrator comprised by tubes 80 and 81 is normally quiescent until actuated by a trigger pulse applied via capacitor 83 from trigger generator 72. The control grid of tube 81 is biased positive, by means of grid resistor 92 being connected to a positive potential, so that in the quiescent state anode current flows through tube 81 and creates a positive voltage drop across common cathode resistor 89. This common cathode voltage is effective on tube 80, being equivalent to a negative grid voltage, to reduce the anode current essentially to zero. When a positive trigger pulse is applied to the control grid of tube 80, plate current flows so as to cause a voltage drop across plate load resistor 88. This voltage drop is applied as a negative pulse via coupling capacitor 90 to the control grid of tube 81, and results in anode current cut off. Multivibrator action occurs in the well-known manner so that a positive voltage pulse is produced across plate load resistor 91 and a negative pulse across cathode resistor 89. The duration of these pulses is determined primarily by the values of coupling capacitor 90 and grid resistor 92. Adjustment of the duration over a considerable range is possible by changing the positive bias on the control grid of tube 80 by means of potentiometer 84 which, together with resistor 85, comprises a voltage divider connected to the positive voltage source. Resistor 86 keeps the A.C. load impedance, at the control grid of tube 80, sufficiently high and capacitor 87 provides a low impedance return to the common ground. The negative output pulse across cathode resistor 89 is applied to a coupling capacitor 93 whose value is chosen, together with that of load resistor 96, so as to provide differentiation. The resulting signal across resistor 96 is comprised by a sharply negative pulse, corresponding to the onset of the applied pulse, and a sharply positive pulse corresponding to the trailing edge of the applied pulse. It will be noted that this positive pulse corresponds also to the trailing edge of the pulse at the plate of tube 81. Since the control grid of tube 98 is normally negative with respect to the cathode, the applied negative pulse has no effect; the following positive pulse, however, triggers the multivibrator comprised by tubes 98 and 99, and associated components, into action as previously described for the preceding multivibrator. A following multivibrator may be triggered via capacitor 104, and any other associated multivibrators in a similar manner.

The sequence of positive gating pulses produced at the output plates of tubes 81 and 99 is applied to the screen grids of electronic gate tubes 105 and 106 so as to effect sequential operation. When the positive pulse from tube 81 is applied across screen load resistor 108 via coupling capacitor 109, the sudden increase in screen potential greatly increases the transconductance of gate tube 106 and allows carrier frequency signal impressed on the control grid to appear in amplified form at the plate and across the primary of plate load transformer 77. The amplified continuous carrier frequency signal at the secondary of transformer 77 is then applied as excitation to pulser unit 79, resulting in a high power electrical impulse comprised by one or more cycles of the carrier frequency. This electrical impulse is then used to energize the proper transmitting transducer in the sequence. At the termination of the positive pulse applied to the screen of gate tube 106, a similar positive pulse is applied to the screen of gate tube 107 via coupling capacitor 110 from the plate of multivibrator tube 99. Amplified carrier frequency signal then appears across the primary of transformer 76 and is applied to pulser circuit 78 so as to supply an electrical impulse to the correct transmitting transducer. Although the description has been limited to a sequence of two impulses for purposes of simplification, it will be understood that additional impulses are readily provided for by use of additional multivibrators, electronic gates and pulser circuits.

The description in connection with FIGURES 3, 4 and 5 of the drawing has concerned an arrangement in which each electrical impulse in the sequence follows immediately upon termination of the preceding impulse; under some exploration conditions, however, it may be desirable to have the electrical impulses spaced apart. For example, practical considerations may necessitate the use of shorter impulses while maintaining the same vertical spacing between transmitting transducers. Also, it may be necessary to use various spacings between transmitting transducers while retaining the same impulse duration. In the arrangement shown in the block diagram of FIGURE 6, the carrier generator, frequency divider and trigger generator units, which are not shown, may be similar to those described in connection with FIGURE 3. Continuous carrier frequency signals are applied to the electronic gates 113 and 118 which are normally non-conducting. Delay multivibrator 111 is arranged to produce an initial pulse, simultaneously with application of the input trigger pulse, and a delayed pulse as determined by the circuit parameters. The initial pulse is applied to a duration multivibrator 112 which produces an output gating pulse of adjustable duration for application to gate 113. Carrier frequency signal then passes through gate 113 and excites pulser circuit 114 so as to produce an electrical impulse for energization of transmitting transducer 115. The delayed pulse from delay multivibrator 111 is applied to another delay multivibrator 116 which in turn produces as output an initial pulse and a delayed pulse. The initial pulse actuates duration multivibrator 117 which produces gating pulse output for application to gate 118. Carrier frequency signal then is applied to pulser circuit 119 so as to supply a high power electrical impulse for energization of transmitting transducer 120. Thus provision is made for adjusting the duration of the sonic impulses impressed by transmitting transducers 115 and 120, while retaining independent control of the spacing between the sonic impulses in the sequence.

The method and apparatus which have been described provide very high power sonic impulses for use in geophysical exploration, without increasing the peak power requirement on the prime power supply, pulsers or transmitting transducers. While a single arrangement of the plurality of transducers has been shown and described for purposes of illustration, other configurations are possible. By arranging the transmitting transducers in suitable pattern in the horizontal plane, as well as the vertical, additional benefits may be obtained from the resulting beam of sonic energy. Under some conditions of operation it may be desirable to arrange the transducers in a single hole in the earth, with vertical distances between transducers equal to VP. A preferred embodiment has been disclosed, but it is to be understood that numerous changes and modifications are possible without departing from the scope of the invention.

Having thus described the invention, I claim:

1. Apparatus for use in generating sonic impulses within the earth comprising a source of continuous carrier frequency signal, a plurality of normally non-conducting electronic gates to which the carrier frequency signal is applied, a frequency divider energized by said source to produce a lower frequency signal, a trigger generator actuated by said lower frequency signal to produce trigger pulse output, a plurality of sequentially operating multivibrators triggered by the output from said trigger generator to produce in sequence output gating pulses of duration T and repetition period P, P being not less than T, means applying said output gating pulses to said electronic gates to render said gates conducting, a plurality of pulser circuits connected to the output of said gates, a plurality of transmitting transducers spaced vertically in the earth by a distance equal to VP where V is the velocity of sonic waves in earth, and connecting means for applying the outputs of said pulser circuits to said transducers in vertical order, starting with the transducer nearest the surface.

2. Apparatus for use in generating sonic impulses within the earth comprising a source of continuous carrier signal, a plurality of normally non-conducting electronic gates to which said carrier signal is applied, a frequency divider synchronized with said source to produce a lower frequency signal, a trigger generator actuated by said lower frequency signal, a plurality of sequentially operating delay multivibrators triggered by the output of said trigger generator, a plurality of duration multivibrators, each coupled to one of said delay multivibrators, said duration multivibrators being triggered in sequence by output pulses from said plurality of delay multivibrators and producing a sequence of output gating pulses of repetition period P, means applying said output gating pulses to said electronic gates to render said gates conducting, a plurality of pulser circuits connected to the outputs of said gates, a plurality of transmitting transducers spaced vertically in the earth by distances equal to VP where V is the velocity of sonic waves in earth, and connecting means for applying the outputs of said pulser circuits to said transducers in vertical order, starting with the transducer nearest the surface.

References Cited in the file of this patent

UNITED STATES PATENTS

| | | |
|---|---|---|
| 1,971,688 | Lange | Aug. 28, 1934 |
| 1,998,412 | Prescott | Apr. 16, 1935 |
| 2,688,124 | Doty et al. | Aug. 31, 1954 |
| 2,730,187 | Hawkins et al. | Jan. 10, 1956 |
| 2,745,507 | Bodine | May 15, 1956 |
| 2,780,795 | Ambrosio | Feb. 5, 1957 |